(12) United States Patent
Anderson et al.

(10) Patent No.: US 7,389,635 B2
(45) Date of Patent: Jun. 24, 2008

(54) TWISTED MIXER WITH OPEN CENTER BODY

(75) Inventors: Morris G. Anderson, Mesa, AZ (US); David F. Ross, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 547 days.

(21) Appl. No.: 11/000,730

(22) Filed: Dec. 1, 2004

(65) Prior Publication Data

US 2006/0112675 A1   Jun. 1, 2006

(51) Int. Cl.
*F02K 1/48* (2006.01)

(52) U.S. Cl. .............................. 60/204; 60/39.5; 60/262; 181/220; 239/406

(58) Field of Classification Search ................. 60/39.5, 60/204, 226.1, 262, 264, 772; 181/220; 239/265, 239/17, 403, 406
See application file for complete search history.

(56) References Cited

U.S. PATENT DOCUMENTS

| | | | |
|---|---|---|---|
| 358,345 A | * | 2/1887 | Gennert ...................... 239/406 |
| 4,045,957 A | | 9/1977 | Disabato |
| 4,487,017 A | | 12/1984 | Rodgers |
| 4,543,784 A | | 10/1985 | Kirker |
| 4,548,034 A | | 10/1985 | Maguire |
| 4,576,002 A | | 3/1986 | Mavrocostas |
| 4,686,826 A | | 8/1987 | Koshoffer et al. |
| 4,909,346 A | | 3/1990 | Torkelson |
| 6,463,992 B1 | | 10/2002 | Dowhan et al. |
| 6,606,854 B1 | | 8/2003 | Siefker et al. |
| 2002/0088443 A1 | | 7/2002 | Marhaler et al. |

* cited by examiner

*Primary Examiner*—L. J. Casaregola
(74) *Attorney, Agent, or Firm*—Ingrassia, Fisher & Lorenz, P.C.

(57) ABSTRACT

An exhaust mixer assembly having a twisted mixer and an open centerbody is provided. The open centerbody is centrally disposed within the twisted mixer and helps to provide efficient cooling of exhaust air from gas turbine engines. A method for cooling exhaust air from a gas turbine engine using the exhaust mixer assembly of the invention is also provided.

31 Claims, 8 Drawing Sheets

FIG. 8

TWISTED MIXER WITH OPEN CENTER BODY

GOVERNMENT RIGHTS

This invention was made with Government support under DAAH10-03-2-0007 awarded by U.S. Army. The Government has certain rights in this invention.

BACKGROUND OF THE INVENTION

The present invention generally relates to exhaust mixers and, more particularly, to exhaust flow mixers for gas turbine engines that reduce the temperature and visibility of hot parts of the engine.

Exhaust can exit a turbine engine with a significant amount of swirl or rotation about the engine centerline. This swirl is usually removed with an exit guide vane to increase engine power before it is exhausted into the atmosphere. However, exit guide vanes are heavy, expensive, and may not work well at part power conditions.

The turbine exhaust can also be mixed with air from a bypass stream using a multi-lobed type of exhaust mixer. Mixing the exhaust with cooler air can reduce the noise level generated by gas turbine engines. Furthermore, in certain applications, the cooling of the exhaust air is important for blocking the visibility of the hot parts of the engine. While 100% efficiency of mixing is desirable to give a uniform temperature of the mixed exhaust and bypass stream, the mixers currently used have mixing efficiencies significantly below 100%.

There are many examples of multi-lobed mixers in the prior art. U.S. Pat. No. 4,476,002 describes a multi-lobed exhaust mixer for turbine engines having troughs and lobes, the trough and lobes having confronting pairs of flow surfaces which are twisted between their upstream and downstream ends. The multi-lobed mixer is designed to be used with a bullet centerbody. U.S. Pat. No. 6,606,854 describes a multi-lobed mixer where the lobes are shaped to block at least a portion of the hot inner surface of the mixer or hot parts of the exhaust portion of a turbine engine. The mixer of the '854 patent is also designed to be used with a bullet centerbody. While the multi-lobed mixers of the prior art show increased efficiency in the mixing of the exhaust and bypass streams to give a uniform temperature, they fall short of the goal of 100% efficiency, leaving room for further improvements.

As can be seen, there is a need for a mixer that mixes exhaust and bypass streams from a turbine engine with increased efficiency. Such an increased efficiency would result in a uniform temperature of the stream resulting from mixing engine exhaust with the bypass stream.

SUMMARY OF THE INVENTION

In one aspect of the invention there is provided an exhaust mixer assembly comprising a twisted mixer comprising a plurality of lobes and a plurality of troughs defined between the lobes, wherein the lobes and troughs are twisted about a centerline axis of the twisted mixer; and an open centerbody centrally disposed within the twisted mixer. The twist of the lobes and troughs of the twisted mixer may be from about 10° to about 30° with respect to the leading edge of the lobes.

In another aspect of the invention there is provided an exhaust mixer assembly comprising a twisted mixer comprising a plurality of lobes and a plurality of troughs defined between the lobes, wherein the lobes and troughs are twisted about a centerline axis of the twisted mixer, the twist being no greater than 60° with respect to leading edges of the lobes and wherein the twisted mixer further comprises an outer surface and an inner surface; an open centerbody centrally disposed within the twisted mixer wherein said centerbody has a cylindrical shape and wherein the centerbody further comprises an outer surface and an inner surface; an inner flow path, the inner flow path defined by the outer surface of the open centerbody and the inner surface of the twisted mixer; and an outer flow path, the outer flow path defined by the troughs of the twisted mixer.

In a further aspect of the invention there is provided a gas turbine engine comprising; an exhaust mixer assembly attached to the engine, the exhaust mixer assembly comprising a twisted mixer comprising a plurality of lobes and a plurality of troughs defined between the lobes, wherein the lobes and troughs are twisted about a centerline axis of the twisted mixer and an open centerbody centrally disposed within the twisted mixer wherein said centerbody has a cylindrical shape; an outer engine casing covering the engine and exhaust mixer assembly; an outer flow path for bypass air defined between the outer engine casing and the twisted mixer; and an inner flow path for exhaust air defined between the twisted mixer and the open centerbody.

In yet another aspect of the present invention there is provided a method of cooling exhaust air from a gas turbine engine comprising the steps of streaming the exhaust air through an inner flow path of an exhaust mixer assembly, the inner flow path defined between a twisted mixer and an open centerbody of the exhaust mixer assembly, the twisted mixer comprising a plurality of lobes and a plurality of troughs defined between the lobes, wherein the lobes and troughs are twisted about a centerline axis of the twisted mixer and wherein the open centerbody is centrally disposed within the twisted mixer; streaming bypass air through an outer flow path of the exhaust mixer assembly, the outer flow path defined between the twisted mixer and an outer engine casing; and mixing the exhaust air and bypass air as they exit the exhaust mixer assembly. As the exhaust air mixes with the bypass air, the temperature of the exhaust air may decrease by at least about 500° F.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an exhaust mixer assembly and a method for cooling exhaust air from a gas turbine engine using the exhaust mixer assembly are provided. The exhaust mixer assembly may comprise a twisted mixer and an open centerbody. The twisted mixer may further comprise a plurality of lobes and a plurality of troughs defined between the lobes. The lobes and troughs may be twisted about a centerline axis of the twisted mixer. The open centerbody may be centrally disposed within the twisted mixer. The centerbody may have an aerodynamic shape, for example, a cylindrical shape. The exhaust mixer assembly may efficiently mix together hot exhaust air with cooler bypass air to produce an exhaust with a reduced temperature. Producing exhaust with lower temperature results in lower noise levels from the engine and can improve performance. Furthermore, particularly for military applications where stealth may be necessary, suppression of infrared heat which normally emanates from the rear of gas turbine engines by lowering the exhaust temperature may make the engines less likely to be observed using heat-seeking observation methods. The exhaust mixer assembly of the present invention may be used with gas turbine engines, for example, but not limited to, turboshaft or turbofan gas turbine engines. Turboshaft gas turbine engines may be used in tanks, helicopters and boats while turbofan gas turbine engines may be used in aircraft.

The exhaust mixing assembly of the present invention may provide for excellent cooling of exhaust air expelled from gas turbine engines. The twisted mixer may reduce or eliminate the rotation of the exhaust air as it moves from a turbine to an exhaust nozzle in a gas turbine engine. This, in turn, may improve performance. The presence of the open centerbody may help to cool the hot exhaust air even more efficiently. The open centerbody may also allow cooler air to enter the open body, thus providing cooling for the engine aft frame. Finally, the open centerbody allows for easy access to the turbo machinery downstream of the exhaust mixer assembly. The prior art used a solid bullet centerbody to control flow of the exhaust air through the mixer. This solid bullet centerbody, unlike the open centerbody of the present invention, can retain heat and decrease the efficiency of cooling the exhaust air.

Figure 1:
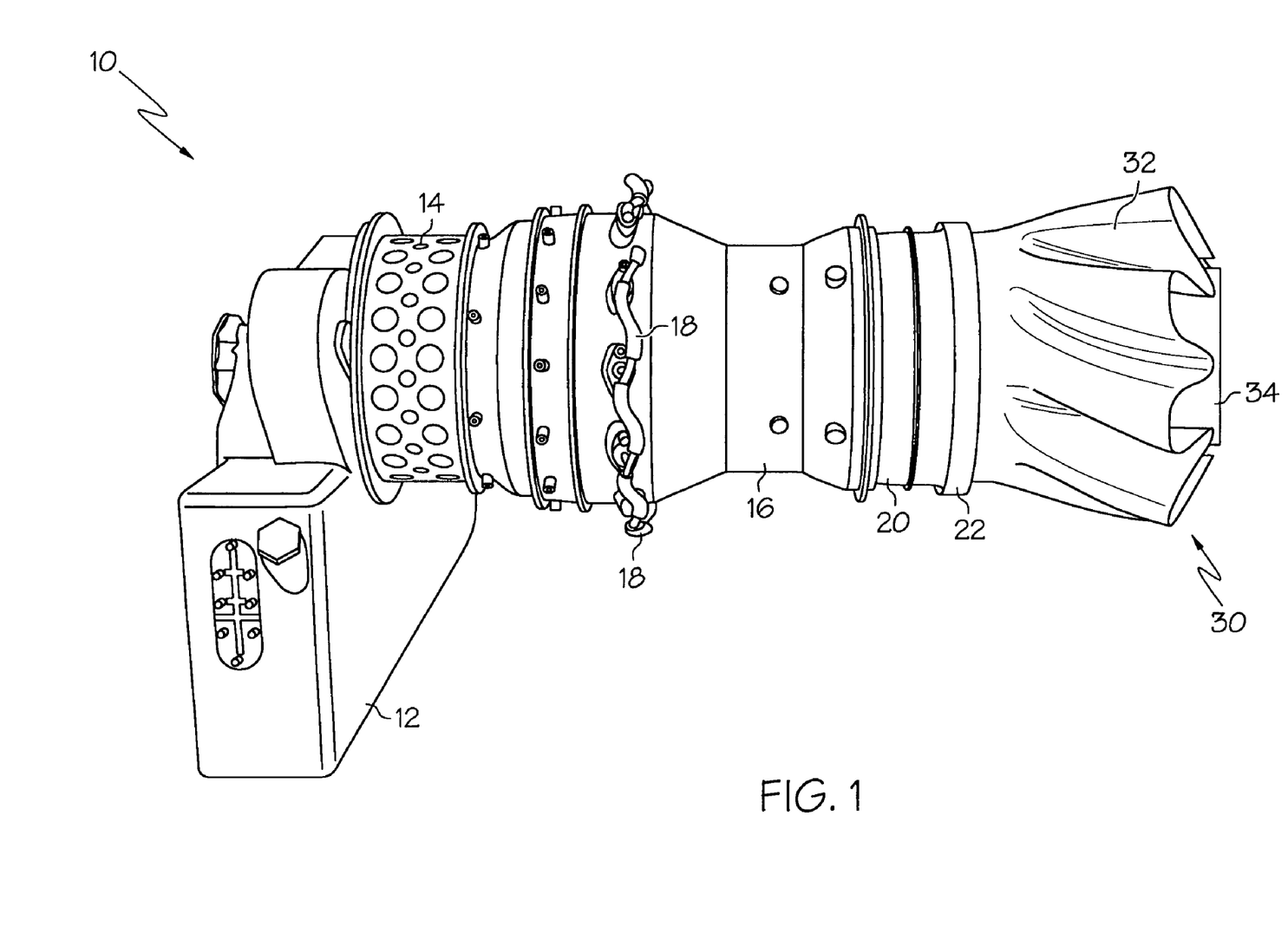
FIG. 1 is a side view of the engine of a gas turbine engine with an exhaust gas mixing assembly according to the present invention.
Figure 2:
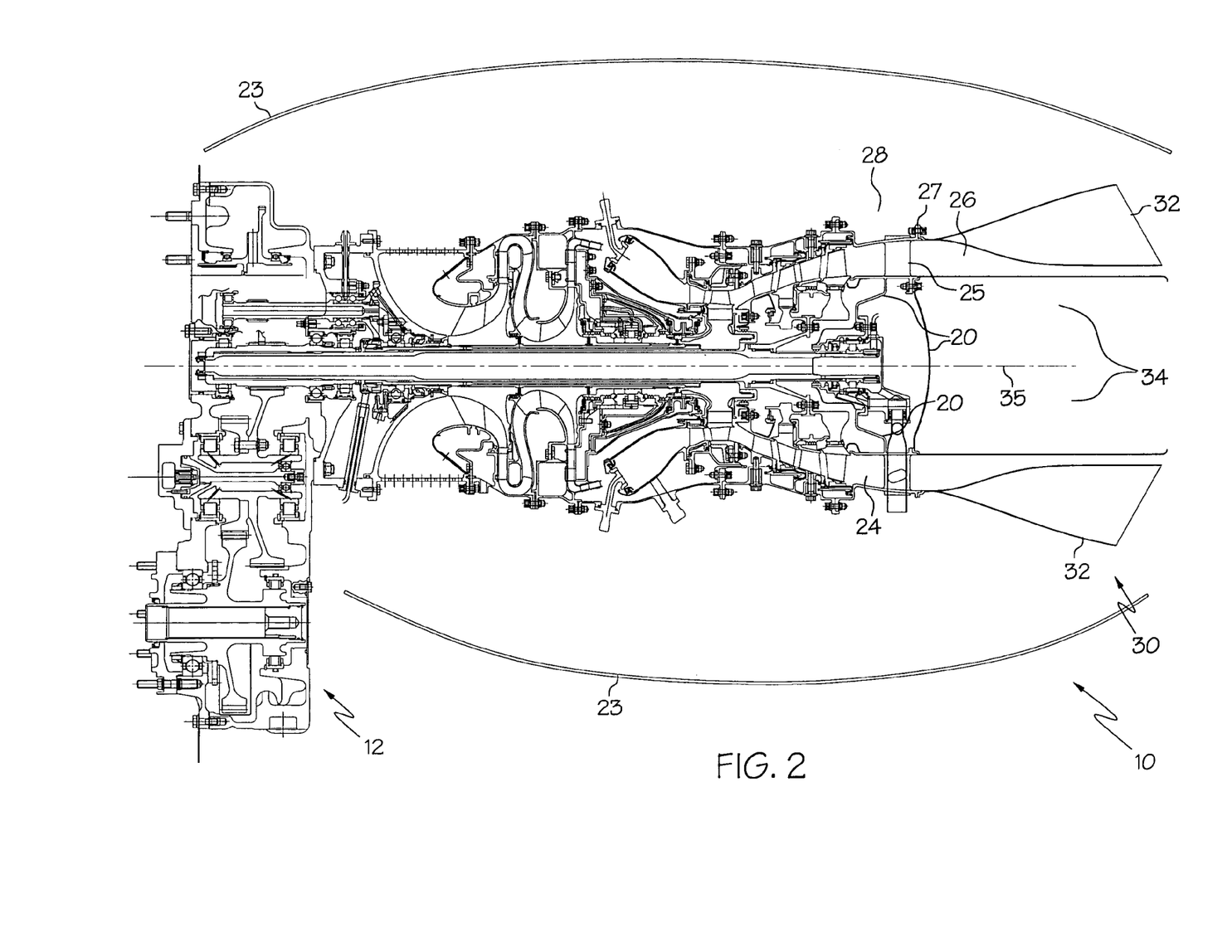
FIG. 2 is a sectional side view of the engine of FIG. 1 according to the present invention.

Illustrated in FIG. 1 is a turbine engine 10 which may comprise a gear box 12, air intake openings 14, a casing 16 covering the turbo machinery of the turbine engine 10, fuel lines 18 and a rear bearing support and aft frame 20. An exhaust mixer assembly 30 may be attached to turbine engine 10 at rear bearing support and aft frame 20. Exhaust mixer assembly 30 may further comprise a twisted mixer 32 and an open centerbody 34 wherein open centerbody 34 may be centrally disposed within twisted mixer 32. FIG. 2 is a cross-sectional view of turbine engine 10 and exhaust mixing assembly 30. The exhaust air may stream from a turbine exit 24 into an inner flow path 26. Inner flow path 26 may be defined between twisted mixer 32 and open centerbody 34. The bypass air may stream through an outer flow path 28 which may be defined between an outer engine casing 23 and twisted mixer 32.

While exhaust mixer assembly 30 may comprise twisted mixer 32 and open centerbody 34, twisted mixer 32 and open centerbody 34 may be discrete parts and may not be attached to each other. Twisted mixer 32 and open centerbody 34 may be configured to produce exhaust mixer assembly 30 by their attachment to turbine engine 10.

As illustrated in FIGS. 1 and 2, twisted mixer 32 may be attached to turbine engine rear bearing support and aft frame 20 by means known in the art. By way of non-limiting example, twisted mixer 32 may be attached to rear bearing support and aft frame 20 using a ring clamp 22 (FIG. 1). Alternatively, twisted mixer 32 may further comprise a flange 27 and twisted mixer 32 may be attached to a rear bearing support and aft frame support strut 20 by bolted flange 27 (FIG. 2). Open centerbody 34 may be attached to turbine engine 10 at rear bearing support and aft frame 20 such that open centerbody 34 may be centrally disposed within twisted mixer 32. By way of non-limiting example, open centerbody 34 may be bolted to rear bearing support as illustrated in FIG. 2.

Figure 3A:
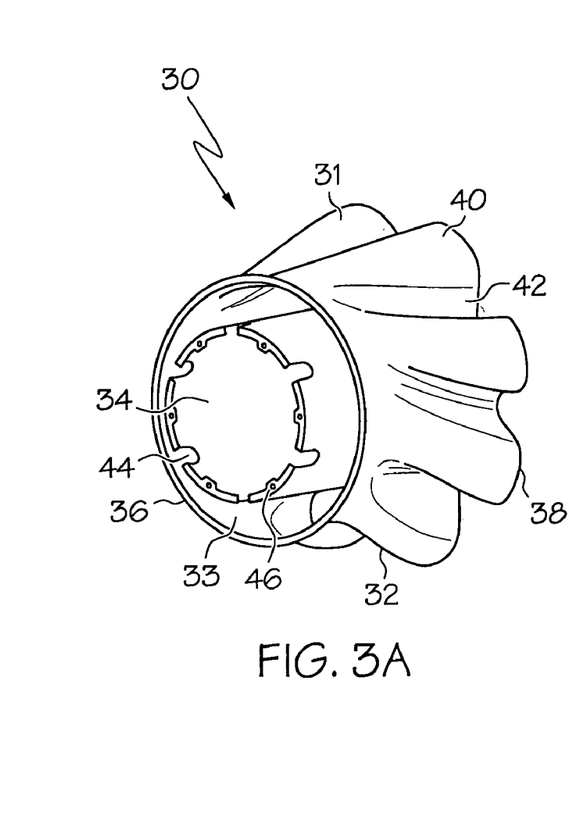
FIG. 3A is an upstream view of an exhaust gas mixing assembly according to the present invention.
Figure 3B:
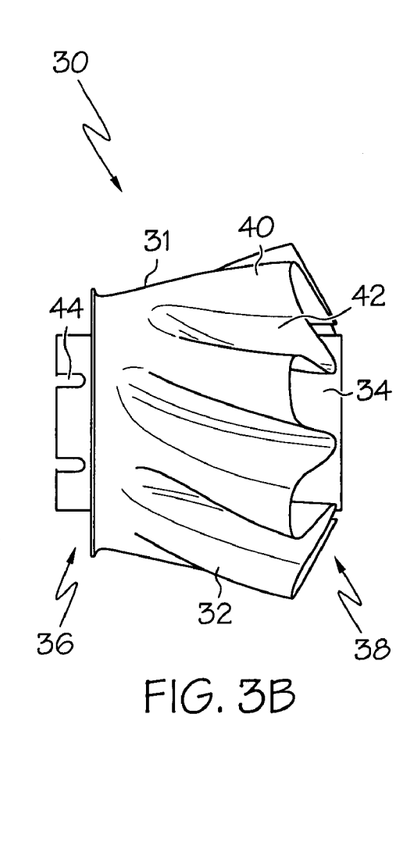
FIG. 3B is a side view of an exhaust gas mixing assembly according to the present invention.
Figure 3C:
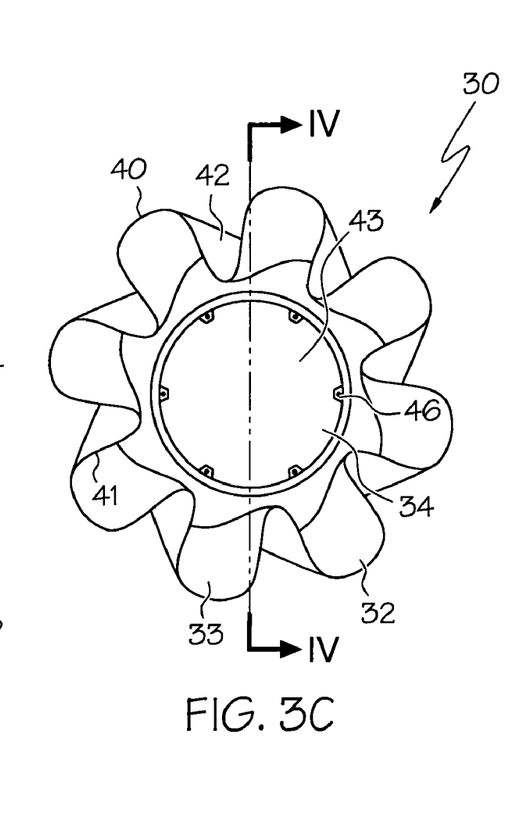
FIG. 3C is a downstream view of an exhaust gas mixing assembly according to the present invention.
Figure 4:
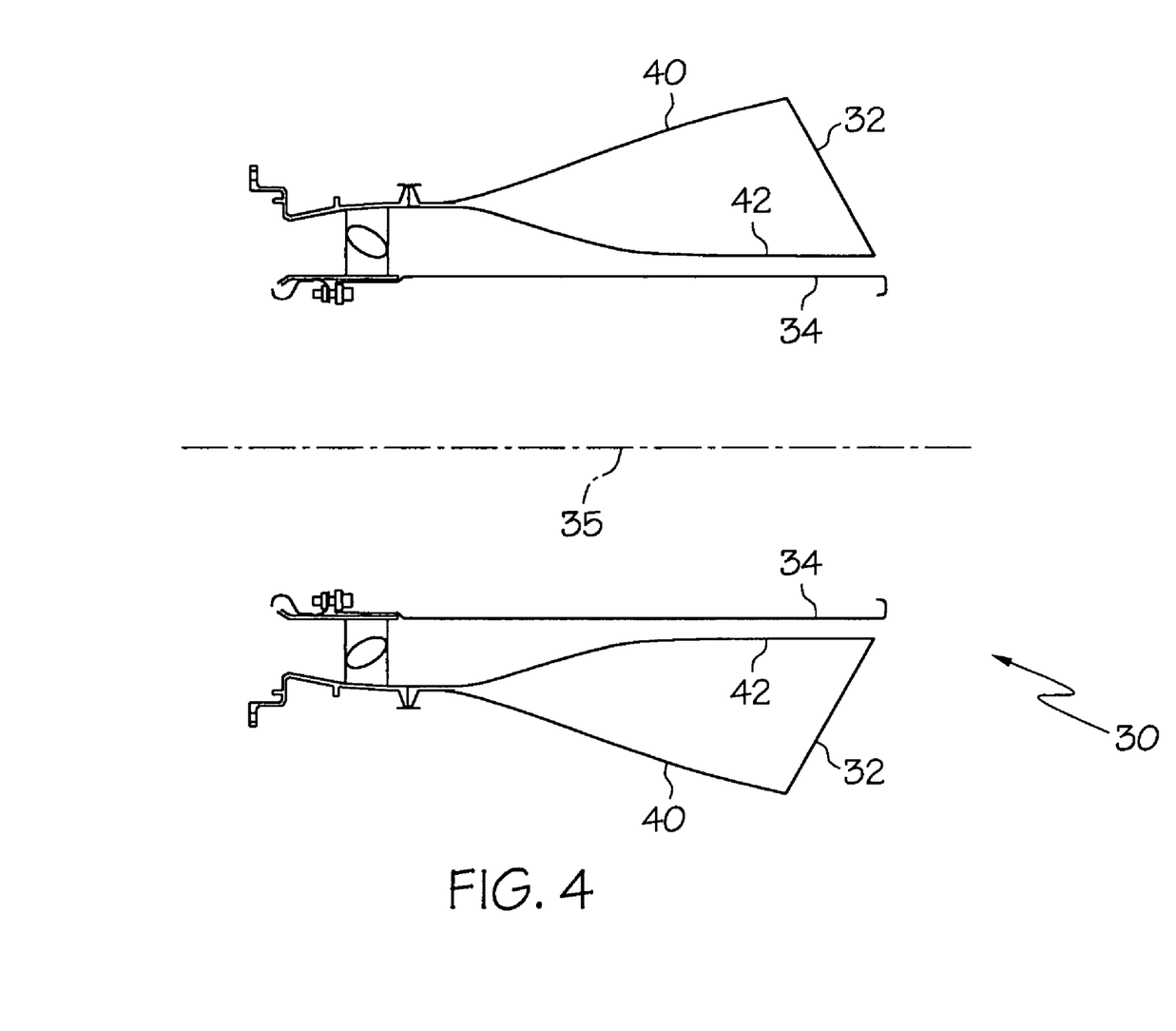
FIG. 4 is a side sectional view of an exhaust gas mixing assembly along the IV-IV axis of FIG. 3C according to the present invention.

Exhaust mixer assembly 30 may comprise twisted mixer 32 and open centerbody 34 where open centerbody 34 may be centrally disposed within twisted mixer 34 as shown in FIGS. 3A-3C. A cross-section of exhaust mixer assembly 30 along the IV-IV axis of FIG. 3C is shown in FIG. 4.

Exhaust mixer assembly 30 may comprise an upstream end 36 and a downstream end 38 where the bypass air and exhaust air may enter exhaust mixer assembly 30 at upstream end 36 and then may be expelled from exhaust mixer assembly 30 at downstream end 38. Twisted mixer 32 may further comprise a plurality of lobes 40 and a plurality of troughs 42 defined between lobes 40. Lobes 40 and troughs 42 may be twisted about a centerline axis of the twisted mixer 32. The degree of twist may vary depending upon the amount of turbine exit swirl as well as the dimensions of the engine itself. In one illustrative example the degree of twist may be not greater than about 60° with respect to a leading edge 41 of lobe 40. In yet another illustrative example, the degree of twist may be from about 10° to about 30° with respect to leading edge 41 of lobe 40. As the bypass air streams over the outer surface 31 of the twisted mixer it may be channeled into troughs 42 on the outer surface. Conversely, as the exhaust air moves along in inner surface 33 of twisted mixer 32 it may be channeled into lobes 40. As both the bypass air and the exhaust air are passed through twisted mixer 32, both streams may gain rotational components of velocity in addition to their basic rearwards velocity. These rotational components may allow the bypass air and the exhaust air to mix effectively as they leave upstream end 38 of the exhaust mixer assembly 30 and may also increase the efficiency of the engine by increasing thrust.

Open centerbody 34 may be disposed within twisted mixer 32 as shown in FIGS. 3A-3C. Open centerbody 34, as shown in FIGS. 3A-3C, is centrally disposed with twisted mixer 32. It will be appreciated that open centerbody 34 may be disposed within twisted mixer 32 where it is not centrally aligned while still allowing for efficient mixing of exhaust air and bypass air. Open centerbody 34 may also be aerodynamic in design. As a non-limiting example, open centerbody 34 may have a cylindrical shape with smooth sides and a central opening 43. A cylindrical open centerbody 34 may have the same diameter along the entire length as shown in FIGS. 3A-3C, or it may have a smaller diameter downstream and a larger diameter upstream. Conversely, open centerbody 34 may have a larger diameter downstream and a smaller diameter upstream. As the hot exhaust air flows through inner flow path 26, open centerbody 34 may aid in channeling the exhaust air through troughs 42, increasing the efficiency of mixing the exhaust air with the bypass air. Open center body 34 may have an open or a closed upstream end. When the upstream end is open, central opening 43 may also allow cooling air to reach rear bearing support and aft frame 20 and other exposed engine parts. Cooling of rear bearing support and aft frame 20 and other exposed engine parts may suppress infrared heat emanating from the engine and thus may reduce heat visibility of the engine. In the prior art, the twisted mixer was often configured in a way to block the hot aft frame and exposed engine parts which may have compromised efficiency of mixing. Finally, central opening 43 may allow for easy access to rear bearing support and aft frame 20 and service lines, reducing the need to disassemble exhaust mixer assembly 30 for servicing. Open centerbody 34 may further comprise bolt hole flanges 46 for bolting open centerbody 34 to rear bearing support and aft frame 20. Open centerbody 34 may also comprise service line openings 44 which may be used for running service lines through exhaust mixing assembly 30 or to allow for additional access to turbine engine 10.

While exhaust mixer assembly 30 of FIGS. 3A-3C shows twisted mixer 32 having eight lobes and troughs, it is contemplated that twisted mixer 32 may have any number of lobes or troughs, depending upon the amount of mixing and thrust desired from a gas turbine engine. The degree of twist may also be dependent on the turbine exit swirl. It will also be appreciated that the dimensions and shape of open centerbody 34 may be designed to work in concert with twisted mixer 32 to give optimal cooling and thrust. Therefore, although shown as a smooth cylinder with a length longer than that of twisted mixer 32 in FIGS. 3A-3C as an illustrative example, the actual dimensions may be determined based on the desired cooling or thrust. The shape and size of exhaust mixing assembly 30 may be determined empirically using computational fluid dynamics (CFD) codes. CFD codes are well known in the art and can either be commercially obtained or written by the skilled artisan to use to determine the dimensions twisted mixer 32 and open centerbody 34. Non-limiting examples of commercial CFD codes that may be used with the present invention are FLUENT™, CFX, or STAR-CD. Using the CFD codes the skilled artisan may determine the dimensions required to give optimal cooling and thrust in the desired application.

Figure 5:
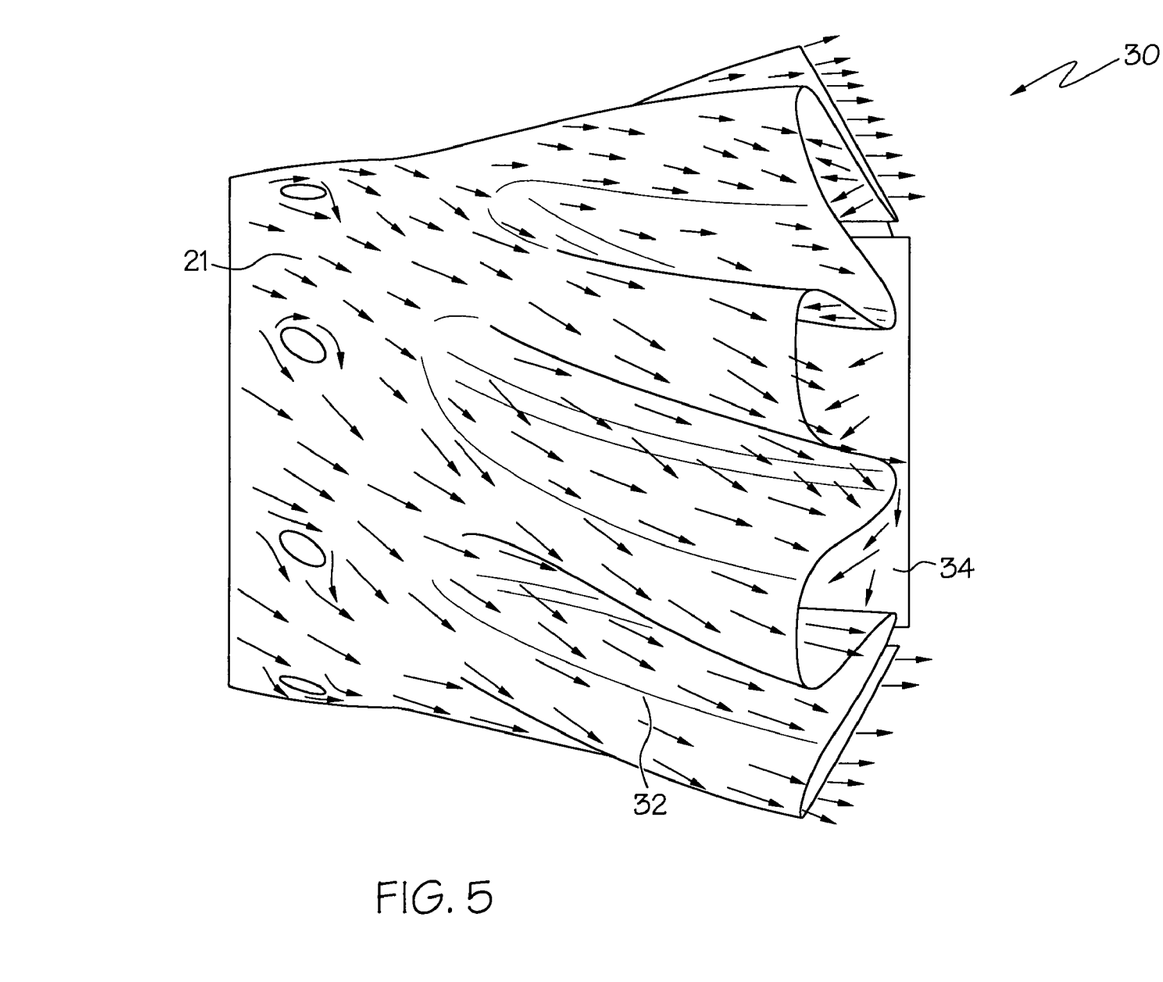
FIG. 5 is a side view of an exhaust gas mixing assembly showing the flow of exhaust air according to the present invention.
Figure 6:
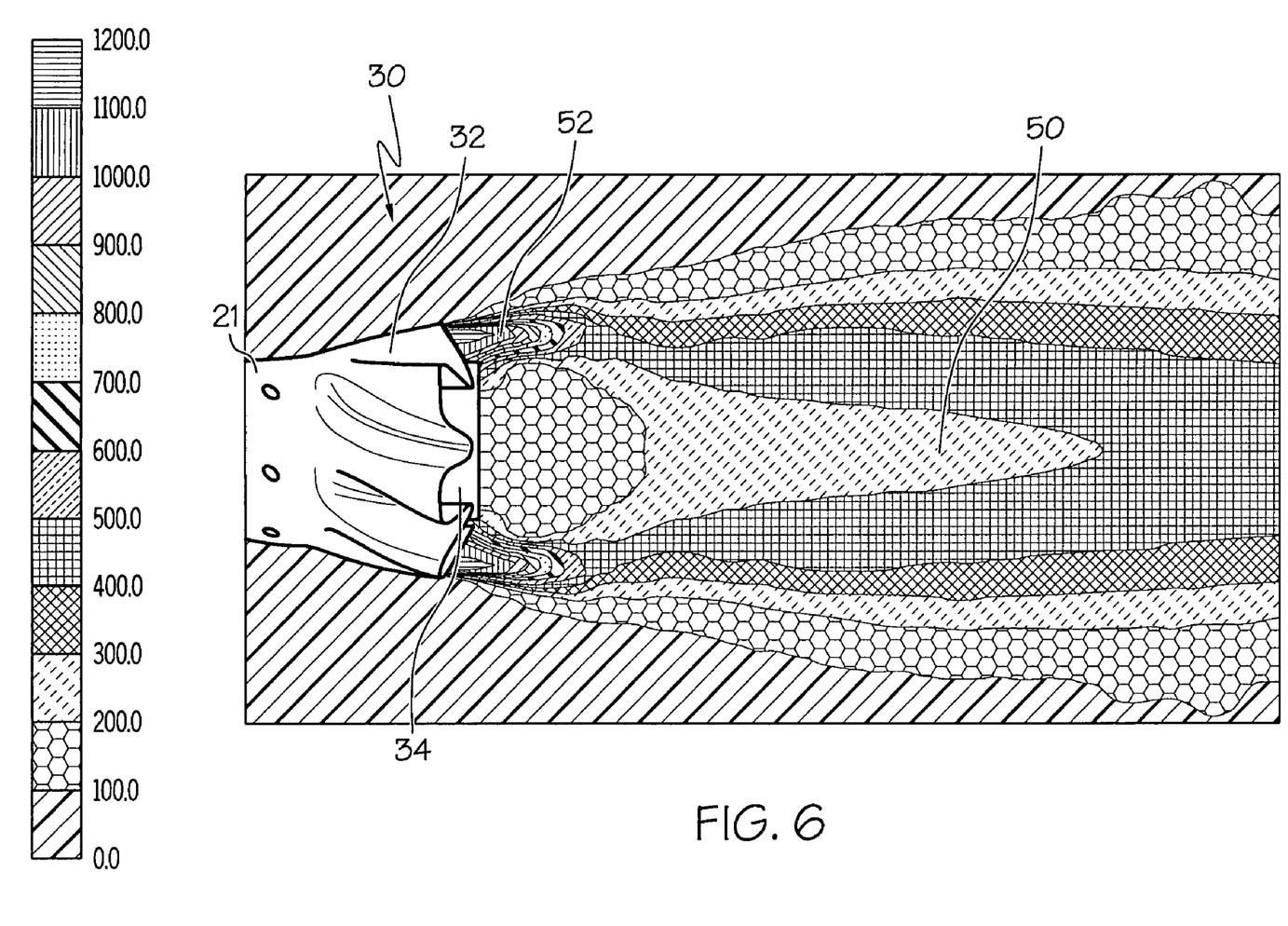
FIG. 6 illustrates the calculated temperature of the exhaust air as it exits the exhaust gas mixing assembly of the present invention.
Figure 7:
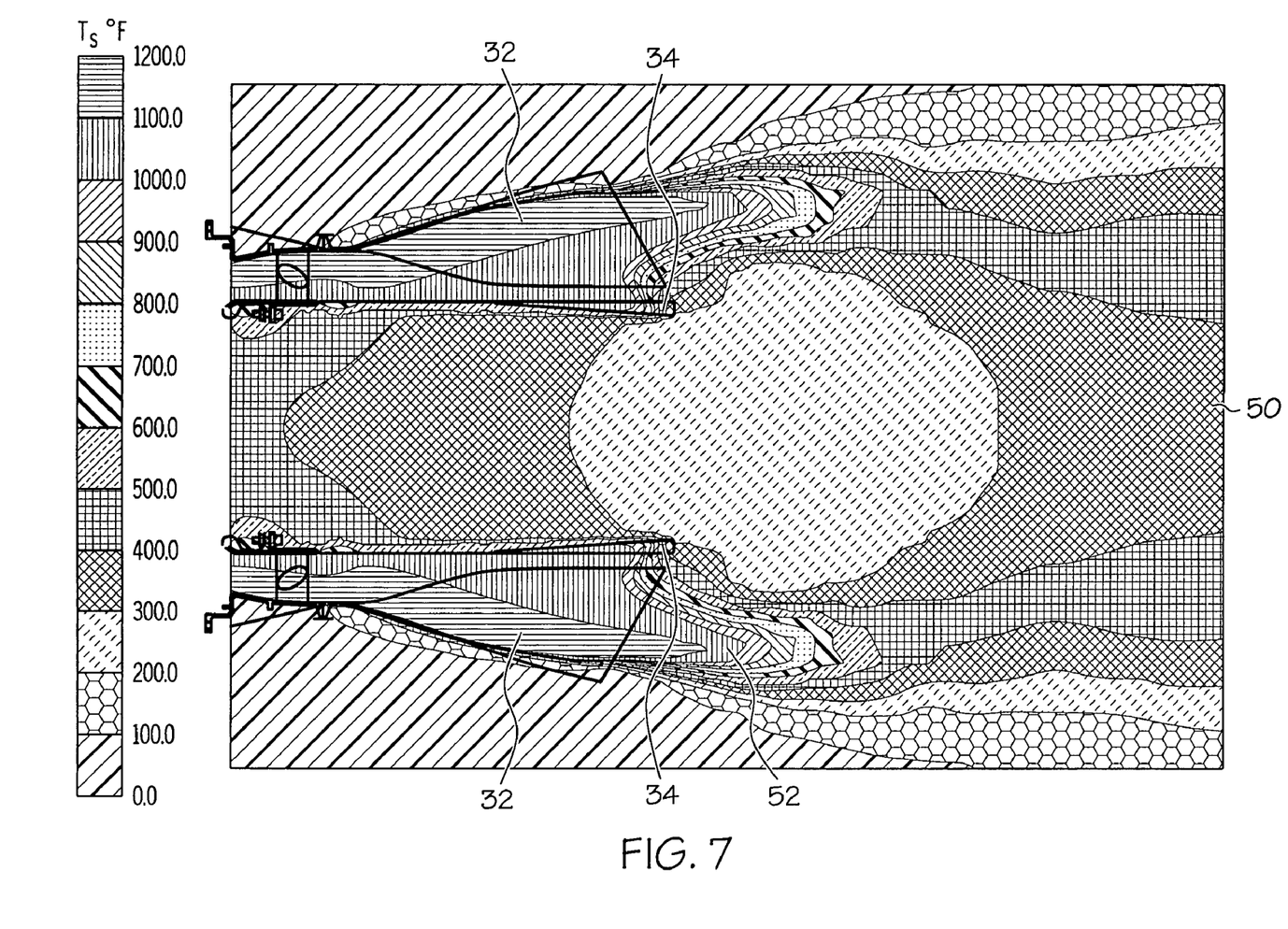
FIG. 7 illustrates the calculated temperature of an exhaust gas mixing assembly according to the present invention.

In way of illustration, FIG. 5 illustrates a CFD solution for a particular engine showing the computed air flow through exhaust mixer assembly 30. FIGS. 6 and 7 then illustrate the cooling of exhaust air using the same parameters as for FIG. 5. As shown in FIG. 6, exhaust mixer assembly 30 of the present invention may efficiently and quickly mix exhaust air with bypass and ambient air as indicated by the cooler plume 50 of exhaust seen away from exhaust mixer assembly 30. The exhaust air in cooler plume 50 may be about 300° F. to about 500° F. as compared to exhaust air at upstream end 38 of exhaust mixer assembly 30, shown as 52, which may be is approximately 1000° F. to about 1200° F. Therefore exhaust mixer assembly 30 of the present invention may reduce the temperature of exhaust air by at least 500° F. Moreover, as illustrated in FIG. 7, open centerbody 34 may significantly cool aft frame 21 and rear bearing support 20. The temperature within opening 43 may be from about 300° F. to about 500° F. By way of comparison, if open centerbody 34 were replaced with the solid bulleted centerbody of the prior art, the temperature of the centerbody would be from about 1000° F. to about 1200° F., approximately the same temperature as the exhaust air before cooling.

Exhaust mixing assembly 30 may be constructed using materials known in the art such as, but not limited to, INCO 625. Exhaust mixing assembly 30 may be made of materials that allow it to be as light in weight as possible while being able to function reliably.

Figure 8:
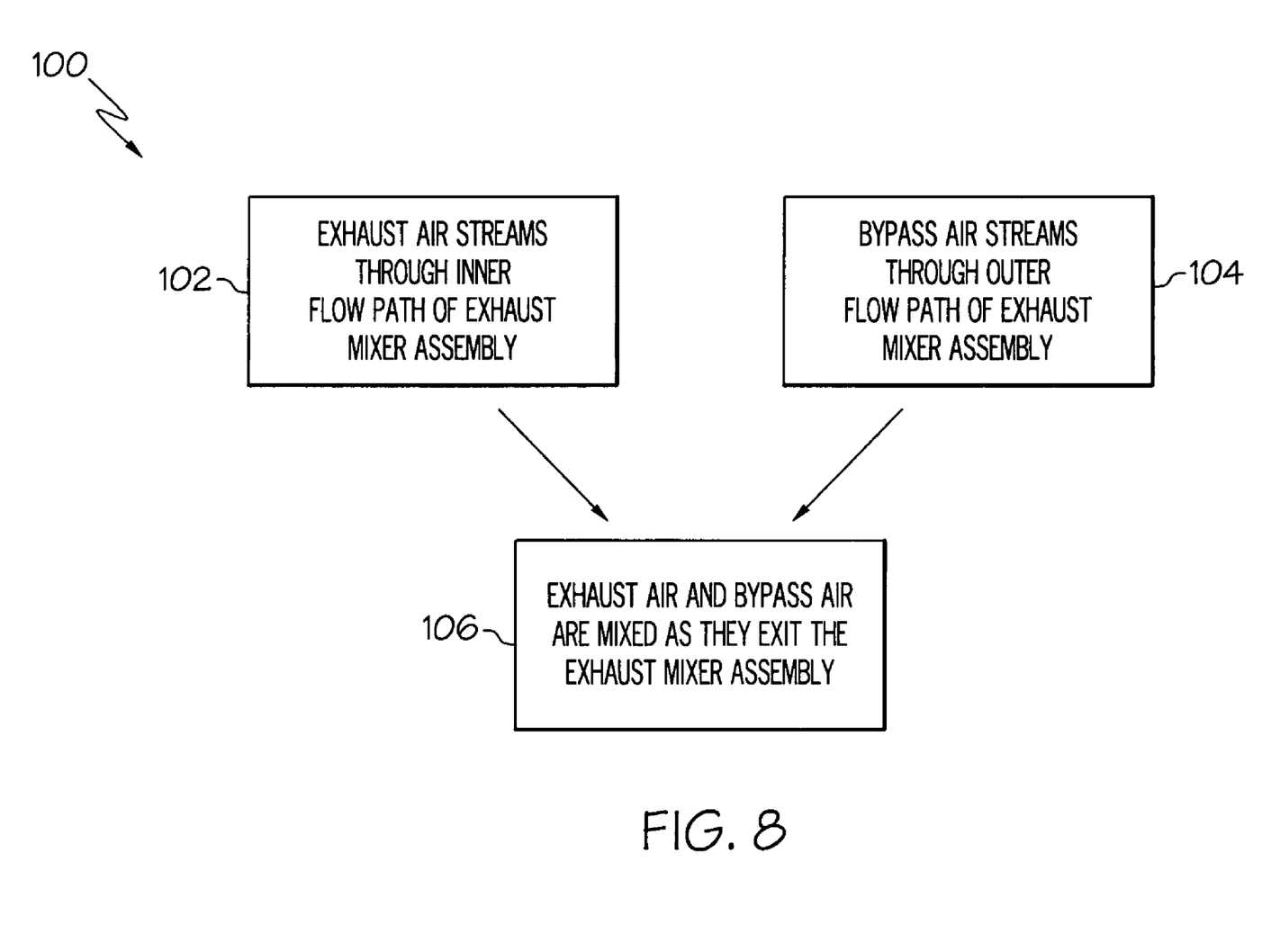
FIG. 8 is a schematic showing a method of cooling exhaust air of a gas turbine engine according to the present invention.

A method for cooling exhaust air in a gas turbine engine is also provided. As illustrated in FIG. 8, method 100 may comprise step 102 where exhaust air may be streamed through an inner flow path of an exhaust mixer assembly, where the inner flow path may be defined between a twisted mixer and an open centerbody of the exhaust mixer assembly, the twisted mixer comprising a plurality of lobes and a plurality of troughs defined between the lobes, wherein the lobes and troughs are twisted about a centerline axis of the twisted mixer and wherein the open centerbody is centrally disposed within the twisted mixer. Method 100 may further comprise step 104 in which bypass air may be streamed through an outer flow path of the exhaust mixer assembly, where the outer flow path may be defined between the twisted mixer and an outer engine casing and step 106 in which the exhaust air and bypass air may be mixed as they exit the exhaust mixer assembly. As illustrated in FIGS. 6 and 7, method 100 may efficiently and rapidly mix exhaust air and bypass air to decrease the temperature of exhaust air exiting a gas turbine engine.

It should be understood, of course, that the foregoing relates to exemplary embodiments of the invention and that modifications may be made without departing from the spirit and scope of the invention as set forth in the following claims.

We claim:

1. An exhaust mixer assembly for cooling exhaust from a turbine engine, the exhaust mixer assembly comprising:
   a twisted mixer comprising a plurality of lobes and a plurality of troughs defined between the lobes, wherein the lobes and troughs are twisted about a centerline axis of the twisted mixer;
   an open centerbody disposed within the twisted mixer;
   an outer casing adapted to at least partially cover the engine;
   an inner flow path, the inner flow path defined by the outer surface of the open centerbody and the inner surface of the twisted mixer; and
   an outer flow path, the outer flow path defined by the lobes and troughs of the twisted mixer and the outer engine casing.

2. The exhaust mixer assembly of claim 1 wherein the lobes and troughs are twisted at an angle of no greater than 60° with respect to the centerline axis.

3. The exhaust mixer assembly of claim 1 wherein the lobes and troughs are twisted at an angle of from about 10° to about 30° with respect to the centerline axis.

4. The exhaust mixer assembly of claim 1 wherein the open centerbody is centrally disposed within the twisted mixer.

5. The exhaust mixer assembly of claim 1 wherein the open centerbody has a cylindrical shape with an upstream end and an open downstream end and wherein a diameter of the upstream end is the same as a diameter of the downstream end.

6. The exhaust mixer assembly of claim 1 wherein the open centerbody has a cylindrical shape with an upstream end and an open downstream end and wherein a diameter of the upstream end is greater than a diameter of the downstream end.

7. The exhaust mixer assembly of claim 1 wherein the open centerbody has a cylindrical shape with an open or closed upstream end and an open downstream end and wherein a diameter of the upstream end is less than a diameter of the downstream end.

8. The exhaust mixer assembly of claim 1 wherein the open centerbody further comprises an upstream end and at least one flange on the upstream end of the centerbody.

9. The exhaust mixer assembly of claim 1 wherein the open center body further comprises an upstream end and open notches for service lines on the upstream end of the centerbody.

10. The exhaust mixer assembly of claim 1 wherein the open centerbody and the twisted mixer are attached to a rear bearing support and aft frame of a turbine engine.

11. An exhaust mixer assembly for cooling exhaust from an engine, the exhaust mixer assembly comprising:
- a twisted mixer comprising a plurality of lobes and a plurality of troughs defined between the lobes, wherein the lobes and troughs are twisted about a centerline axis of the twisted mixer, the twist about the centerline axis being no greater than 60° and wherein the twisted mixer further comprises an outer surface and an inner surface;
- an open centerbody centrally disposed within the twisted mixer wherein the open centerbody has a cylindrical shape and wherein the open centerbody further comprises an outer surface and an inner surface;
- an outer engine casing at least partially covering the engine;
- an inner flow path, the inner flow path defined by the outer surface of the open centerbody and the inner surface of the twisted mixer; and
- an outer flow path, the outer flow path defined by the lobes and troughs of the twisted mixer and an outer engine casing.

12. The exhaust mixer assembly of claim 11 wherein the twist of the lobes and troughs of the twisted mixer is from about 10° to about 30° with respect to a leading edge of the lobes.

13. The exhaust mixer assembly of claim 11 wherein the twisted mixer comprises at least eight lobes and eight troughs.

14. The exhaust mixer assembly of claim 11 wherein the exhaust mixer assembly is part of an engine exhaust nozzle.

15. A turbine engine comprising:
- a gear box;
- air intake openings;
- a casing covering turbo machinery of the turbine engine;
- fuel lines;
- a rear bearing support and aft frame; and
- wherein an exhaust mixer assembly is attached to the engine at the rear bearing support and aft frame, the exhaust mixer assembly comprising a twisted mixer comprising a plurality of lobes and a plurality of troughs defined between the lobes, wherein the lobes and troughs are twisted about a centerline axis of the twisted mixer and an open centerbody centrally disposed within the twisted mixer wherein said centerbody has a cylindrical shape.

16. The turbine engine of claim 15 wherein the twisted mixer is attached to the rear bearing support and aft frame independently of the open centerbody.

17. The turbine engine of claim 16 wherein the twisted mixer is attached to the rear bearing support and aft frame by a ring clamp.

18. The turbine engine of claim 16 wherein the open centerbody further comprises an upstream end, wherein the upstream end comprises bolt hole flanges and wherein the open centerbody is connected to the rear bearing support and aft frame by bolting through the bolt hole flanges.

19. A gas turbine engine comprising:
- an exhaust mixer assembly attached to the engine, the exhaust mixer assembly comprising a twisted mixer comprising a plurality of lobes and a plurality of troughs defined between the lobes, wherein the lobes and troughs are twisted about a centerline axis of the twisted mixer and an open centerbody centrally disposed within the twisted mixer wherein said centerbody has a cylindrical shape;
- an outer engine casing covering the engine and exhaust mixer assembly;
- an outer flow path defined between the outer engine casing and the engine and twisted mixer; and
- an inner flow path defined between the twisted mixer and the open centerbody.

20. The gas turbine engine of claim 19 wherein a twist of the lobes and troughs of the twisted mixer is from about 10° to about 60° with respect to the centerline axis.

21. The gas turbine engine of claim 19 wherein the twisted mixer is attached to the engine by a ring clamp.

22. The gas turbine engine of claim 19 wherein the twisted mixer is attached to the engine by a bolted flange.

23. The gas turbine engine of claim 19 wherein the open centerbody is attached to a rear bearing support and aft frame of the engine.

24. The gas turbine engine of claim 19 wherein the gas turbine engine is a turboshaft engine.

25. The gas turbine engine of claim 24 wherein the turboshaft engine is used in either a tank or helicopter.

26. The gas turbine engine of claim 19 wherein the gas turbine engine is a turbofan engine.

27. A method of cooling exhaust from a gas turbine engine comprising the steps of:
- streaming the exhaust through an inner flow path of an exhaust mixer assembly, the inner flow path defined between a twisted mixer and an open centerbody of the exhaust mixer assembly and wherein the open centerbody is centrally disposed within the twisted mixer;
- streaming bypass air through an outer flow path of the exhaust mixer assembly, the outer flow path defined between the twisted mixer and an outer engine casing; and
- mixing the exhaust and bypass air as they exit the exhaust mixer assembly.

28. The method of claim 27 wherein the exhaust decreases at least about 500° F. after mixing with the bypass air.

29. The method of claim 27 wherein the temperature of the exhaust after mixing with the bypass air is about less than or equal to 500° F.

30. The method of claim 27 wherein the method is used in a turboshaft gas turbine engine.

31. The method of claim 30 wherein the streaming exhaust and bypass air have a pressure ratio sufficient to produce a desired thrust as they exit the engine.

* * * * *